United States Patent [19]

Lliteras

[11] 4,146,073

[45] * Mar. 27, 1979

[54] DRIVER FOR HIGH TORQUE FASTENER

[76] Inventor: Juan A. Lliteras, 6146 Beachway Dr., Falls Church, Va. 22041

[*] Notice: The portion of the term of this patent subsequent to Jul. 26, 1994, has been disclaimed.

[21] Appl. No.: 795,268

[22] Filed: May 9, 1977

Related U.S. Application Data

[62] Division of Ser. No. 660,534, Feb. 23, 1976, Pat. No. 4,037,514.

[51] Int. Cl.$^2$ ............................................. B25B 15/00
[52] U.S. Cl. .................................... 145/50 A; 403/354
[58] Field of Search ............ 81/71; 85/45; 145/50 R, 145/50 A; 403/354

[56] References Cited

U.S. PATENT DOCUMENTS

| 1,361,059 | 12/1920 | Hoff | 85/45 |
| 2,015,613 | 9/1935 | Baumgarten | 145/50 R X |
| 3,120,251 | 2/1964 | York | 145/50 A |
| 3,540,342 | 11/1970 | Vaughn | 85/45 |
| 4,037,514 | 7/1977 | Lliteras | 85/45 |

FOREIGN PATENT DOCUMENTS

| 182174 | 3/1907 | Fed. Rep. of Germany | 145/50 A |
| 954633 | 12/1949 | France | 85/45 |
| 463313 | 4/1951 | Italy | 85/45 |
| 694858 | 7/1953 | United Kingdom | 81/71 |

Primary Examiner—Gary L. Smith
Attorney, Agent, or Firm—Jim Zegeer

[57] ABSTRACT

There is disclosed a novel driving implement for an arcuate slot, defined by two cylindrical sidewalls, in the head of a fastener. A torque applying shaft is provided with a new moon-shaped bit which may also be described as being a modified crescent-shaped configuration wherein the extremities of the crescent are truncated, the said driving bit being comprised of two vertical cylindrical surfaces converging at both ends.

2 Claims, 10 Drawing Figures

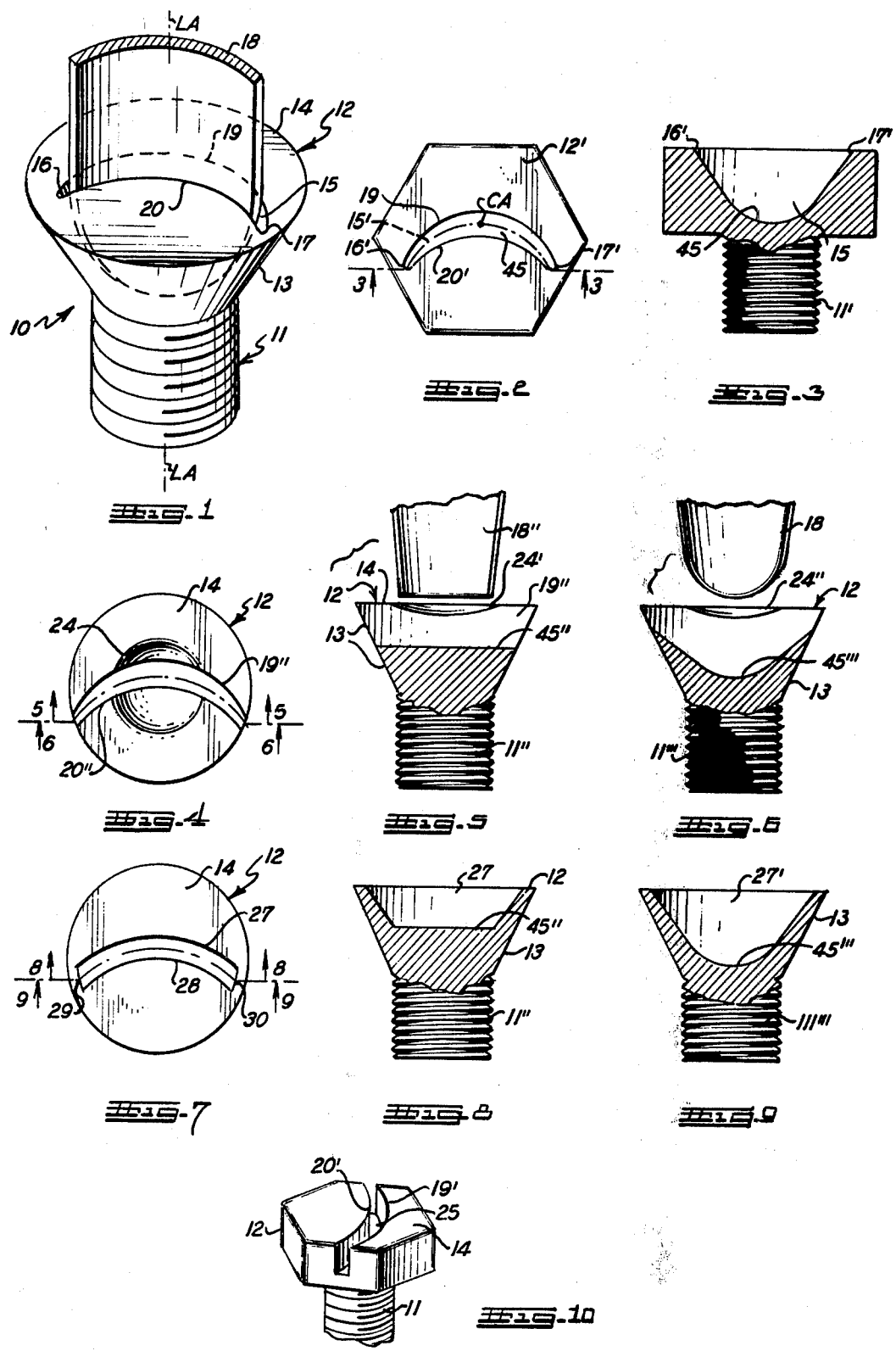

DRIVER FOR HIGH TORQUE FASTENER

This application is a division of my application Ser. No. 660,534, filed Feb. 23, 1976, entitled "High Torque Fastener Head" now U.S. Letters Pat. 4,037,514.

This invention relates to improvements in drivers for high torque fasteners.

The improved driver of this invention will avoid point contacts between the rectangular driver bit and the linear groove as well as the so-called Philips head common in most screws presently found on the market. The improvement contemplated in the present invention provides for extensive surface contacts, thereby distributing the torque applied with the driver more evenly throughout the body of the screw, thus allowing for greater torque, without the risk of injuring the slot (or user when manually driven) by deformation or slippage.

The advantages of the new moon-like configuration of the driver bit are many and easily understandable, as will be apparent to those skilled in the art. Especially in the preferred embodiment it will be noted that the vertical walls of the driver converge at both ends in the shape of a wedge, wherefore the driver bit can never escape from the slot — open ended or not. In whatever direction the bit of the screwdriver is turned, forcing the screw in or out, the wedge-shaped ends of both tools will hold together.

BRIEF DESCRIPTION OF THE DRAWINGS

The above and other objects, advantages and features of the invention will become more apparent from the following specification and accompanying drawings wherein:

FIG. 1 is a top perspective view of the preferred embodiment of my invention with closed end slot and having a driving tool in the slot;

FIG. 2 is the top plan view, with closed end slot with a hex head;

FIG. 3 is a cross-sectional view of the screw head of FIG. 1 taken on lines 3—3 through the slot;

FIG. 4 is a top plan view of the preferred embodiment with open end slot;

FIG. 5 is a cross-sectional view taken on lines 5—5 of FIG. 4 of a straight bottomed slot and a portion of the driving implement about to be inserted, and FIG. 6 is a similar view with a concave bottomed slot taken on lines 6—6 of FIG. 4;

FIG. 7 is a top plan view of a less preferred embodiment of the invention wherein the slot is closed ended and formed by two parallel and concentric cylindrical surfaces;

FIG. 8 is a cross-sectional view, taken on lines 8—8 of FIG. 7 of a straight bottomed slot and FIG. 9 is a cross-sectional view taken on lines 9—9 of FIG. 7 and shows the concave shaped bottom, and FIG. 10 is a perspective view of a hex head fastener having an open ended slot incorporating the invention.

DETAILED DESCRIPTION OF THE INVENTION

FIG. 1 is a perspective view of a screw type fastener 10 having a threaded shank or shaft 11, round head 12 with tapering walls 13 integral with the shank or shaft part 11. In the top surface 14 of head 12 is a slot 15 with closed ends 16 and 17. While the upper surface 14 of head 12 is flat, it could just as well be domed or curved. Slot 15 intersects the longitudinal axis LA of shank or shaft 11 and, as shown in FIG. 1, has received therein the bit end 18 of a screwdriver-type implement. It will be appreciated that as shown in FIG. 2, the head 12' may be hex head or any other shape. This permits the tool to be driven by conventional wrench-type drive implements which may not utilize the slot according to the invention herein. FIG. 3 is a cross-sectional view taken on lines 3—3 of FIG. 2 and shows the slot 15 as having a concave bottom wall 20. The slot shown in FIGS. 1, 2, and 3 is constituted by two cylindrical side walls of different radii, said cylindrical side walls being parallel to the longitudinal axis LA of the shank with the outer wall 20 being of greater radii than the inner wall 19 in a manner that both walls will converge within the boundaries of the screw head so that developing torque forces, when applied by the driving bit 18 of the screwdriver-type implement against one or the other side walls, and having essentially the same cross-sectional configuration of that part of the slot 15 which the bit occupies, always insures the full surface contact between the driver 18 and the slot when driving the screws in or out. The bit has a new moon-shape which may also be described as being a modified crescent-shaped configuration wherein the extremities of the crescent are truncated as illustrated.

In the embodiment shown in FIGS. 4, 5, and 6, the slot is formed by two cylindrical side walls 19" and 20" which side walls converge beyond the boundaries of the screw head 12. In FIG. 5, the bottom of the slot 20" is illustrated as being flat whereas in FIG. 6 the bottom of the slot is concave.

In FIG. 4, the top 14 of screw head 12 is flat and has a slight circular depression or dimple 24 in the center of the slot, around the axis of shank 11" and having a diameter which is greater than the width of the slot 15 but substantially less than the diameter of the screw head. Such recesses or dimples are disclosed in Vaughan U.S. Pat. No. 3,540,342 and permit utilization of the novel slot disclosed herein in combination with power drivers to thereby facilitate "seeking" of the slot by the arcuate tip of the driving blade and is, in effect, a self-aligning high torque screw slot which is described in detail in Vaughan U.S. Pat. No. 3,540,342.

FIG. 7 is a top plan view of a less preferred embodiment of the invention wherein the slot is constituted of two parallel cylindrical surfaces 27 and 28 connected by elements 29 and 30 to form an arcuate slot closed within the boundaries of the top surface 14 of screw head 12. In the case of this slot, without ends 29 and 30 being closed, the bit or implement which would be received within this slot could, upon application of torque forces, slides out. FIG. 8 is a cross-sectional view taken on lines 8—8 of FIG. 7 showing the slot with a flat bottom whereas FIG. 9 is a cross-sectional view taken on lines 9—9 of FIG. 7 showing the slot with a concave bottom 20'''.

The embodiment shown in FIG. 10 is a perspective view of a modification of the embodiment shown in FIG. 2 wherein the screw head 12 is hexagonally shaped and the walls 19' and 20' converge beyond the boundaries of the screw head.

When the arcuate slot, as disclosed herein, is provided with a concave bottom as shown in FIGS. 3, 5, and 9, the driving bit penetrates deeper into the screw head and improves the grasp of the screw head on the driving bit.

SUMMARY

In summary, there is provided an improved fastener having a longitudinal axis and an implement head which includes as an implement driving slot, a pair of spaced, arcuate walls defining the arcuate slot with the arcuate slot intersecting and being transverse to the longitudinal axis of the fastener body. Torque forces applied by an arcuate torquing implement inserted in the arcuate slot, cause an opposite set of reaction forces to bear on at least one distributed surface area. In the preferred embodiment, the arcuate walls are contained in cylindrical surfaces of revolution which intersect each other and the shape of the driving implement corresponds exactly to the arcuate shape of the slot with the least amount of tolerance that manufacturing will permit. The extensive surface contact provided by the arcuate surfaces distributes the torque applied by the driver more evenly throughout the body of the screw thus allowing for a greater torque without the risk of injuring the slot (or user) by deformation or slippage.

While I have shown and described a number of different embodiments along with a preferred embodiment, it is believed that the invention is capable of a number of other modifications without departing from the spirit and scope thereof as defined in the claims appended hereto.

I claim:

1. A screwdriver for driving threaded fasteners having a crescent-shaped arcuate slot in the head thereof comprising:
    a torque-applying shaft,
    an arcuate bit in the end of said torque-applying shaft, said bit being constituted by a pair of axialy parallel cylindrical walls which converge towards each other at the lateral ends thereof, the space between said arcuate walls being occupied by metal which decreases in thickness from the axial center of said bit to said lateral ends, wherein said bit has a modified cresent-shaped configuration wherein the extremities of said crescent are truncated.
2. A screwdriver as defined in claim 1 wherein the extremity of the said arcuate bit is convex.

* * * * *